United States Patent Office 3,572,991
Patented Mar. 30, 1971

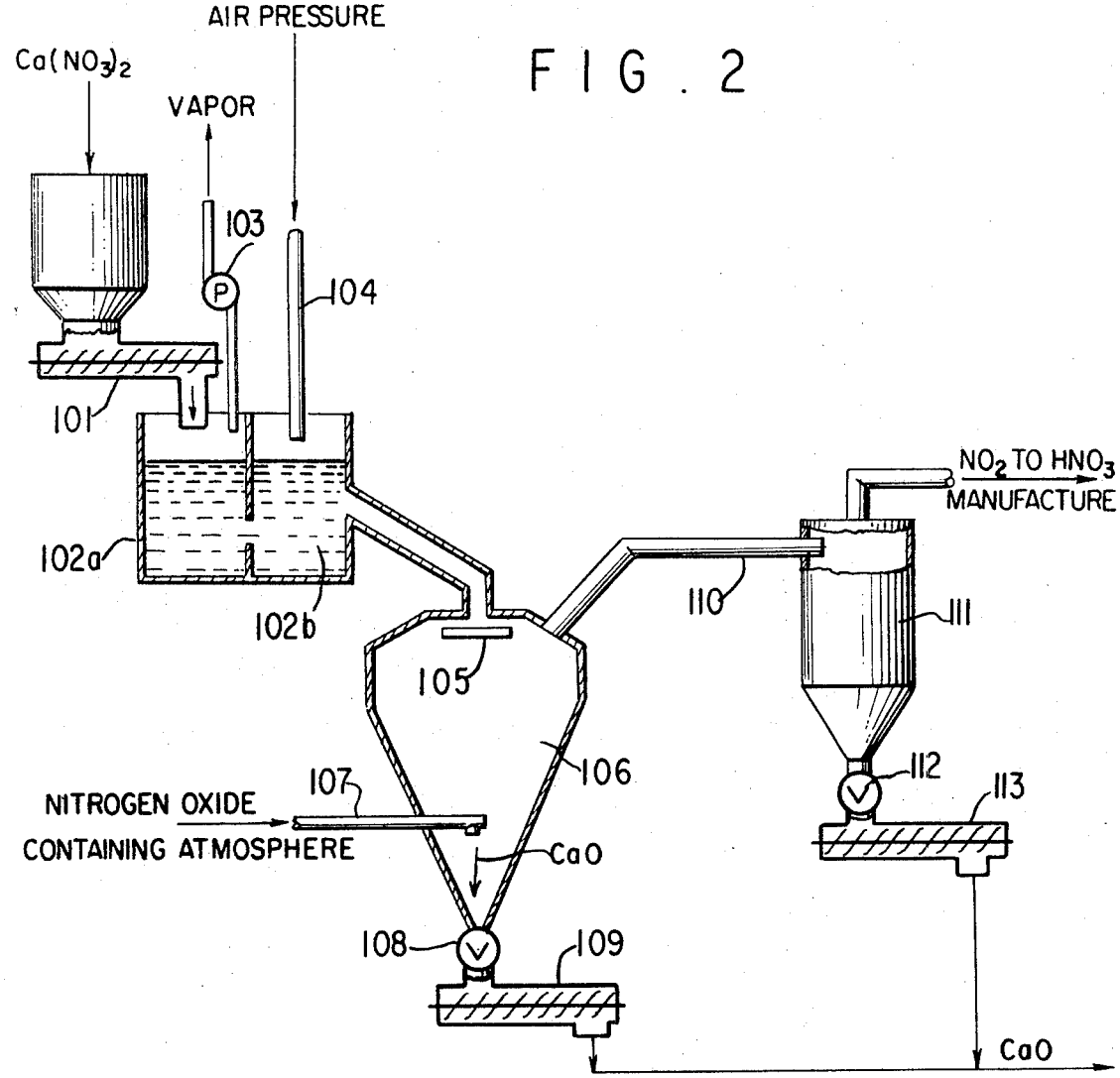

3,572,991
DECOMPOSITION OF CALCIUM NITRATE
Joseph W. Markey, College Park, Ga., assignor to Cities Service Company, New York, N.Y.
Continuation-in-part of application Ser. No. 705,993, Feb. 16, 1968. This application Apr. 1, 1968, Ser. No. 717,886
Int. Cl. C01b 2/42
U.S. Cl. 23—158
7 Claims

ABSTRACT OF THE DISCLOSURE

By decomposing calcium nitrate in the presence of a nitrogen oxide-containing atmosphere, a product gas stream containing a high proportion of nitrogen and a relatively low proportion of undesired inerts may be obtained.

Calcium nitrate is decomposed in the presence of a bed of fluidized solids. The bed may comprise by-product lime that is heated and recycled to the decomposition zone. A portion of the product gas may be recycled to the decomposition zone at a bed fluidizing velocity. The product gases, comprising nitrogen oxides and oxygen, are particularly suitable for use in the formation of concentrated nitric acid.

CROSS-REFERENCE TO RELATED APPLICATION

This application is a continuation-in-part of applicant's pending application, Ser. No. 705,993, filed Feb. 16, 1968, and entitled, "Decomposition of Calcium Nitrate," now abandoned.

BACKGROUND OF THE INVENTION

Field of the invention

This invention relates to the production of phosphoric acid and phosphatic fertilizers, and by-product calcium nitrate, by the nitric acid acidulation of phosphate rock. More particularly, it relates to the decomposition of the calcium nitrate so as to form nitrogen oxides from which additional nitric acid may be produced.

Description of the prior art

In the nitric acid acidulation of phosphate rock for the production of wet process phosphoric acid and phosphatic fertilizers, calcium nitrate is produced as a by-product. This calcium nitrate can be separated from the reaction mixture by methods known in the art, such as by crystallization. In some instances, the separated calcium nitrate is sold as a low analysis nitrogen fertilizer. Its low analysis, however, prevents the economical transport of the calcium nitrate over any considerable distance. Thus, $P_2O_5$ production, as wet process phosphoric acid and phosphatic fertilizers, by nitric acid acidulation is often limited by the local market for the by-product calcium nitrate.

Various efforts have been made, therefore, to thermally decompose calcium nitrate to form lime and nitrogen oxides that can be converted into additional nitric acid. The nitric acid formed in this manner can be recycled for the acidulation of additional phosphate rock. Commercial utilization of such a process has, however, been deterred in part by the large quantity of heat that must be supplied in order to effect decomposition of the calcium nitrate. In addition, various operating difficulties have also adversely affected the prospects for commercialization of this process.

The by-product calcium nitrate is commonly obtained in the form of calcium nitrate tetrahydrate, although a lower hydrate or the anhydrous salt may be produced depending upon the operating conditions employed.

If the anhydrous salt is to be decomposed, this material melts at about 556° C., or somewhat under the decomposition temperature of calcium nitrate. If the tetrahydrate salt is being decomposed, there are two melts between room temperature and the decomposition temperature of the calcium nitrate. Because of these characteristics, three phases normally exist during thermal decomposition. The solid phase comprises calcium nitrate and the lime resulting from decomposition of a portion of the calcium nitrate. A gas phase comprising nitrogen oxides, i.e. NO and $NO_2$, is formed. The liquid phase comprising calcium nitrate melt is caused by the phase change, or melting, that occurs below the decomposition temperature.

Because of the presence of the liquid phase resulting from the melt of calcium nitrate, stickiness and agglomeration of the calcium solids results. In addition, the liquid phase tends to trap lime particles resulting in the caking of the lime on the walls of the decomposition vessel. This caking prevents or reduces proper heat exchange and also tends to hinder the evolution of the nitrogen oxides formed during decomposition. In order to overcome these operating difficulties, it has been heretofore proposed that an aqueous solution of calcium nitrate be sprayed on a recycle bed of calcium oxide in an externally-heated rotary kiln. The mixture of lime and calcium nitrate in the kiln, therefore, ordinarily will contain from about 60% to about 90% by weight of lime. For this purpose, residual lime discharged from the kiln is recycled back into the kiln feed. By maintaining this high portion of lime in the kiln, it is possible to reduce the stickiness of the material and the resultant caking of the solids on the wall of the kiln. Better solids and gas flow through the kiln result. The very high ratio of lime to calcium nitrate, however, results in a significant decrease in the actual available capacity of the kiln. The equipment needed to carry out such a process is, therefore, economically excessive.

It has also been proposed that the calcium nitrate be decomposed in the presence of steam in order to recover the nitrogen values from the calcium nitrate in the form of nitric acid vapors that can be condensed for the recovery of nitric acid in its liquid form. Such a process is shown in the Nossen patent, U.S. 2,737,445. The calcium nitrate decomposes and liberates nitric acid anhydride, $N_2O_5$, which is unstable and tends to combine with the steam to form nitric acid vapors. This anhydride is caused to react with steam before it breaks down into lower nitrogen oxides, and the nitric acid must be rapidly removed from the decomposition zone in order to protect the nitric acid against splitting. Such a process is limited, however, to the production of relatively dilute nitric acid solutions because of the excess of steam that must be employed and is subject to a relatively high cooling requirement in reconstituting the decomposition vapors as aqueous nitric acid.

It is an object of the present invention, therefore, to provide a nitric acid acidulation process for the production of phosphoric acid and phosphatic fertilizers.

It is another object of the present invention to provide a nitric acid acidulation process having improved means for the recovery of the nitrogen values from the by-product calcium nitrate produced by the acidulation process.

It is another object of the present invention to provide an improved calcium nitrate decomposition process.

It is a further object of the present invention to provide a process for the decomposition of calcium nitrate in which the recovery of the nitrogen values therefrom is maximized.

It is a further object of the present invention to provide a calcium nitrate decomposition process in which the nitrogen is recovered principally in the form of nitric oxide and nitrogen dioxide.

It is a further object of the present invention to provide an improved process for the manufacture of nitric acid by thermal decomposition of calcium nitrate.

It is a further object of the present invention to provide a means for manufacturing high concentration nitric acid by the thermal decomposition of calcium nitrate.

SUMMARY OF THE INVENTION

The objects of the present invention are accomplished by a process in which the calcium nitrate is decomposed in a nitrogen oxide-rich atmosphere. The nitrogen values of the calcium nitrate, which are produced in the form of nitrogen oxides, can thus be recovered in a product gas stream containing a relatively high proportion of nitrogen oxides. Conversely, the product gas stream will contain a very low percentage of inert material. By also maintaining the ratio of water to nitrogen oxides as low as possible, a product gas stream particularly well suited for the production of very concentrated nitric acid is obtained.

The calcium nitrate to be decomposed may be injected into a decomposition zone in either solid or liquid form. In one embodiment, the calcium nitrate is injected in the form of a mist or spray of atomized droplets. In another embodiment, the objects of the present invention are accomplished by decomposing calcium nitrate in a fluidized bed decomposition zone. Fluidization may be achieved by recycling a portion of the gaseous product of the decomposition upwardly through the decomposition zone at a bed fluidizing velocity. The heat necessary for decomposition may be supplied by heating the fluidizing gas or the solid particles introduced into the decomposition zone to form and maintain the solids bed.

The solids bed may be maintained by recycling a portion of the by-product lime withdrawn from the bed. The recycled lime may be heated to above the decomposition temperature of the calcium nitrate in a regeneration zone prior to being introduced into the decomposition zone. During their retention in the decomposition zone, the particles or by-product lime tend to grow due to agglomeration and the deposition of newly formed lime on the surface of the existing particles. Thus, the fluidized bed system results in an advantageous growth in the particle size of the lime product. In the decomposition of calcium nitrate under relatively static conditions, as in a rotary kiln, growth is undesired and leads to a build-up of lime in the reactor. Under relatively static conditions, the evolution of gaseous products from the calcium nitrate results in the formation of extremely finely divided calcium oxide particles. The separation of these particles from the decomposition gases constitutes a difficult, but necessary, operation if the product gases are to be used in the manufacture of nitric acid. The larger sized particles of lime formed by means of the fluidized operation of the present invention, on the other hand, permits the obtaining of a product gas stream essentially free of calcium oxide fines.

Continued growth of the recycled lime particles, however, would ultimately result in the particles having a particle size too large for satisfactory fluidization. In the heating of the portion of the by-product lime to be recycled, however, a breakdown in particle size results. Consequently, the lime particles recycled to the decomposition zone following heating in the regeneration zone are of a particle size particularly well suited for the fluidization process of the present invention.

The nitrogen values from the decomposed calcium nitrate are withdrawn from the decomposition zone principally in the form of nitric oxide and nitrogen dioxide. A portion of the product gas stream may be recycled to provide the fluidizing gas employed in the decomposition zone. The remainder of the product stream may be absorbed in water to form nitric acid. In the production of nitric acid in this manner, fines comprising very small particles of lime must be removed from the product gas stream. Since the separation of the fines from the product gas stream constitutes a difficult operation, it is desirable that the amount of fines carried-over in the product gas stream be minimized. In the fluidized operation of the present invention, it has been found that the particles of lime tend to grow in size during their retention in the decomposition zone. The growth of the particles correspondingly reduce the amount of fines and thus minimizes the quantity of fines in the product gas stream.

When the production of very concentrated nitric acid from the product gas stream is desired, it is preferable that the partial pressure of nitrogen oxides in the product gas stream be held as high as possible and that the ratio of water to nitrogen oxides be as low as possible. The introduction of water or inerts, such as nitrogen, advantageously should be restricted or avoided. For this reason, it is desirable that the calcium nitrate be fed to the decomposition bone either as the anhydrous crystalline solid, as a melt of the anhydrous salt, or as a highly concentrated aqueous solution of the salt. In addition, any water or nitric acid introduced into the decomposition zone requires utilization of additional heat to decompose the nitric acid and to raise the temperature of the water and decomposition products to the decomposition temperature. The cooling requirements upon reconstituting this material as aqueous nitric acid are correspondingly increased.

In the embodiment of the present invention, in which the portion of the product gas is recycled to the decomposition zone, the introduction of water or inert gases into the system is thus avoided. This embodiment is, therefore, particularly useful when a very concentrated nitric acid is to be produced from the product gas stream.

The solids withdrawn from the decomposition zone may entrap and carry-over nitrogen oxide gases produced in the decomposition zone. In order to recover these nitrogen values, the solids withdrawn from the decomposition zone may be purged with a gas that is fed back into the decomposition chamber. While any inert gas may be employed, an oxygen-rich gas serves not only to recover the nitrogen values in question from the by-product solids stream, but also tends to assure that the product gas stream comprises essentially nitric oxide, nitrogen dioxide, and excess oxygen. With this product gas stream, very concentrated nitric acid can readily be produced.

The nitric acid produced from the product gases of the present invention may be recycled for acidulation of phosphate rock. The present invention, therefore, provides a convenient and efficient means for recovering and utilizing the nitrogen values in the calcium nitrate formed in the nitric acid acidulation of phosphate rock.

BRIEF DESCRIPTION OF THE DRAWING

The invention is hereinafter further described and illustrated with reference to the accompanying drawings in which:

FIG. 2 is a diagrammatic illustration of the apparatus that may be employed for carrying out an alternate embodiment of the process herein described.

DETAILED DESCRIPTION OF THE INVENTION

Figure 1:
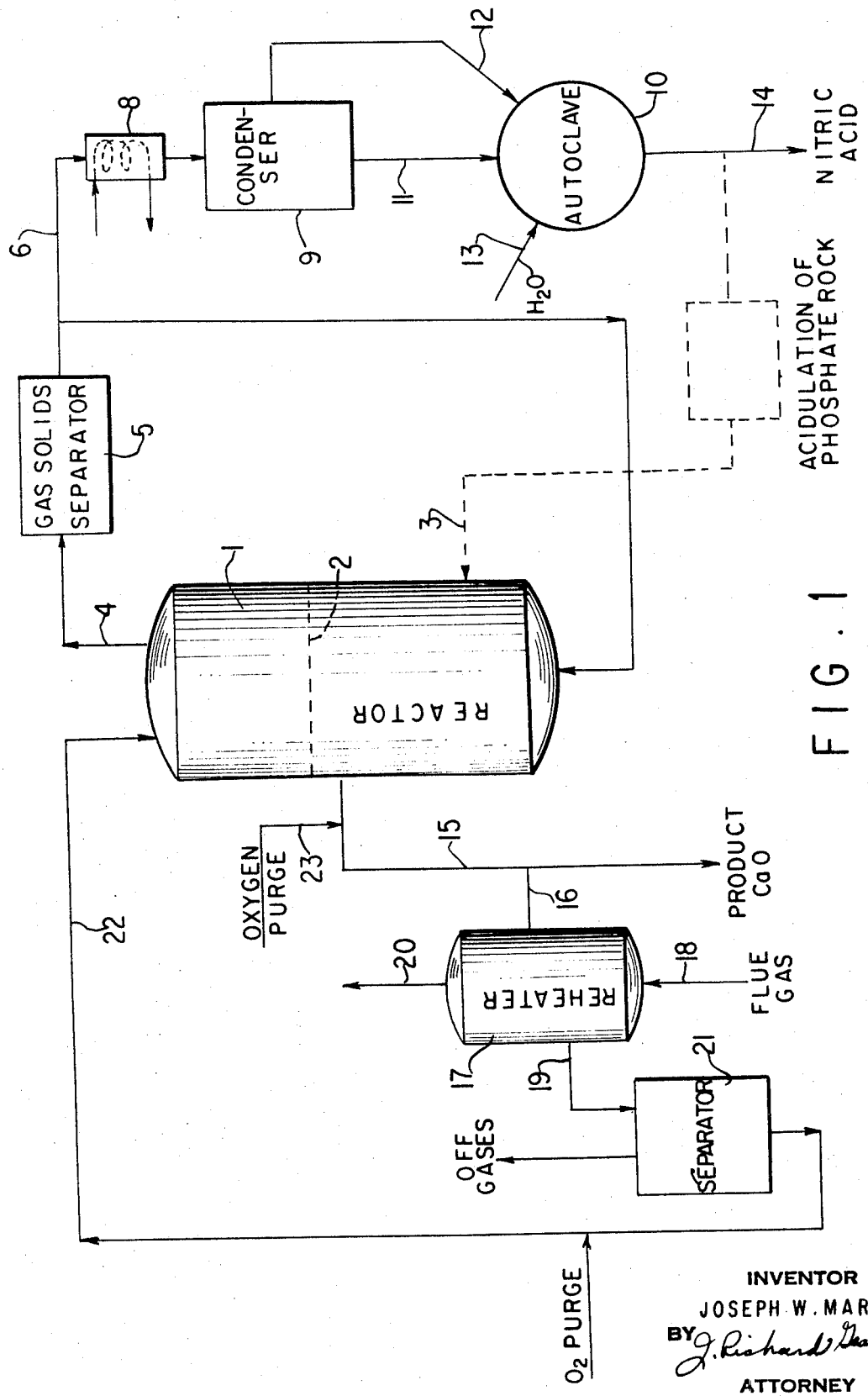
FIG. 1 is a diagrammatic arrangement of the apparatus that may be employed for carrying out an embodiment of the process herein described, the novel features of which are set forth in the appended claims.

Phosphate rock may be acidulated with nitric acid to produce either wet process phosphoric acid or phosphatic fertilizer compositions. The well known Odda process, and several variations thereof, provide for the nitric acid acidulation of phosphate rock and the crystallization and separation of the calcium nitrate formed during the acidulation. The recovery of the nitrogen values from the solid calcium nitrate separated from the reaction mixture is an important factor in the economic significance of the overall process.

In accordance with the present invention, calcium nitrate is decomposed in a nitrogen oxide-containing atmosphere in order to minimize the proportion of inerts included in the resulting product gas stream. By also minimizing or at least restricting the amount of water in the system, a resulting product gas stream may be obtained that is particularly well suited for the production of very concentrated nitric acid. As will hereinafter be set forth in further detail, a variety of techniques may be employed for contacting the calcium nitrate with the nitrogen oxide-containing atmosphere during decomposition.

The nitrogen values in calcium nitrate may be conveniently and economically recovered by the fluidized bed operation of the present invention. The nitrogen is recovered in the form of nitrogen oxides that can readily be employed as in the production of nitric acid. This feature is of particular significance with respect to processes, such as the Odda process, for the nitric acid acidulation of phosphate rock. Such processes may be employed to produce either wet process phosphoric acid or phosphatic fertilizer compositions. Calcium nitrate, a by-product of the nitric acid acidulation process, may be separated from the reaction mixture by known means, as by crystallization in the Odda process. The recovery of the nitrogen values from the solid calcium nitrate is an important factor in the overall economic significance of the acidulation process. In some circumstances, of course, it may be economically feasible to employ the by-product calcium nitrate as a low grade fertilizer. The present invention, however, is directed to those instances in which it is necessary or desirable to recover the nitrogen values from calcium nitrate in a more economical form.

In the practice of the present invention, the calcium nitrate is decomposed in a vertically oriented decomposition zone containing a bed of inert particulate inorganic material maintained in the fluidized state by the passage of an inert gas upwardly through the bed at a spacial velocity sufficient to maintain the bed in a fluidized state. The product gases obtained by the decomposition of the calcium nitrate are withdrawn from the decomposition zone from a point above the fluidized bed. The product gases comprise generally nitrogen oxides. Lime is also produced as a solid by-product of the decomposition reaction. These solids are also withdrawn from the decomposition zone separately from the product gases. The nitrogen values of the calcium nitrate being decomposed are, in this manner, recovered essentially in the form of nitric oxide and nitrogen dioxide.

The bed of solids employed in the present invention may comprise any suitable inert particulate inorganic material. Illustrative of the various inert solids that may be employed are silica, clay, calcium carbonate, calcium oxide, and mixtures thereof. Since solid calcium oxide is produced in the decomposition of the calcium nitrate, the desired quantity of solids may be maintained in the decomposition zone by continuously withdrawing a portion of the solids separately from the product gases. In another embodiment, a portion of the solids removed from the decomposition zone may, of course, be recycled back to the decomposition zone. This feature has particular advantages as will be pointed out hereinafter in further detail.

The bed of solids is maintained in a fluidized state by passing an inert gas upwardly through the decomposition zone at a spacial velocity sufficient to maintain the bed in a fluidized state. While the spacial velocity will depend upon the fineness and density of the inert solids employed, the velocity will generally range from about 0.5 to about 3.0 feet per second.

Any suitable inert gas may be employed as the fluidizing gas of the present invention. For example, air or oxygen can conveniently be employed. As discussed below, it is often desirable that the product gases contain a very low percentage of inert material, e.g. nitrogen, as a diluent. For this reason, it is often convenient to recycle a portion of the product gas stream comprising nitrogen oxides for further passage upwardly through the decomposition zone as the fluidizing gas. In another embodiment of the present invention, the fluidizing gas may comprise carbon dioxide. In this instance, the fluidizing gas is not inert but tends to react with the by-product lime so as to form calcium carbonate. Since this reaction is exothermic, the over-all heat requirements for the decomposition of the calcium nitrate are correspondingly reduced. The by-product calcium carbonate can be removed from the bed and, if desired, a portion thereof may be recycled so as to maintain the desired quantity of solids in the decomposition zone.

It is within the scope of the present invention to inject the calcium nitrate into the decomposition zone in either solid or liquid form. When the product gases are to be employed for the production of very high concentration nitric acid, it is highly advantageous that the partial pressure of nitrogen oxides in the product gas stream be held as high as possible and that the introduction of water into the system be restricted to the extent possible. As previously indicated, the introduction of inerts such as nitrogen can be avoided by recycling a portion of the product gas stream as the fluidizing gas. In order to minimize the amount of water introduced into the system, the calcium nitrate may be fed to the decomposition zone as an anhydrous crystalline solid, as a melt of the anhydrous salt, or as a highly concentrated aqueous solution of the salt. When introduced as the anhydrous crystalline solid, the calcium nitrate may be employed in dry form or in wet form as following washing with a minimum amount of aqueous nitric acid. When the calcium nitrate is introduced as a highly concentrated aqueous solution, the solution may contain some nitric acid.

Calcium nitrate being decomposed should, of course, be heated to at least its decomposition temperature. The decomposition temperature of calcium nitrate is approximately 650° C. at atmospheric pressure. While higher temperatures may be employed in order to hasten the decomposition of the calcium nitrate, it has generally been found that the use of higher temperatures tends to cause some reversion of the nitrogen oxides in the product gas stream to nitrogen. When nitric acid is to be produced from the nitrogen values in the product gas stream, it is desirable that the nitrogen be recovered from the calcium nitrate decomposition operation in the form of nitrogen oxides. The use of temperatures increasingly higher than the decomposition temperature of the calcium nitrate will, for this reason, generally be discouraged. In addition, if the recovery of by-product calcium carbonate is desired in the embodiment in which the fluidizing gas contains carbon dioxide, the temperature should not exceed the decomposition temperature of the calcium carbonate, i.e. about 895° C. The decomposition zone will generally be maintained at a temperature within the range of from about 650° C. to about 675° C. The heat required to maintain the decomposition zone at the required temperature may be supplied in any convenient manner. For example, the solids added to the decomposition zone or the fluidizing gas may be heated to the necessary temperature for maintaining the reactor at decomposition temperature alternately, the reactor may be externally heated.

The product gas stream withdrawn from above the fluidized bed will generally comprise nitrogen oxides. At the operating temperature required to decompose calcium nitrate, the principal nitrogen-bearing gases obtained will be nitric oxide and nitrogen dioxide. The recovery of the nitrogen values from the calcium nitrate in the form of these nitrogen oxides renders the process readily adaptable to a cyclic operation in which nitric acid is employed for the acidulation of phosphate rock. By-product calcium nitrate is decomposed in accordance with the present invention to produce a product gas stream containing nitrogen oxides from which additional nitric acid may readily be obtained. As set forth below, the product gas stream may be used for producing nitric acid having a concentration in a range including the azeotrope of about 68% and may also be employed for the production of very high concentration acids, i.e. 98% or higher. For this purpose, an excess of oxygen over that stoichiometrically required is generally needed for the production of very highly concentrated nitric acid. This excess oxygen can, if desired, be obtained by the use of a fluidizing gas comprising oxygen. Alternately, an oxygen purge countercurrent to the solids withdrawal stream may be employed. In this manner, the nitrogen values that may be entrapped or otherwise carried over into the solids withdrawal stream may be recovered in the form of nitrogen oxides, thus serving also to eliminate nitrogen from the product gases, while likewise adding the excess oxygen that would in any event, have to be added at some stage in order to produce a very concentrated nitric acid.

In the particular embodiment illustrated in FIG. 1, calcium nitrate is decomposed in a vertically oriented reactor 1 having bed 2. The material to be decomposed is introduced into reactor 1 through line 3, while line 4 is provided for the withdrawal of gases from the upper portion of reactor 1. The product gases pass through line 4 to gas-solids separator 5 and to exit line 6. A portion of the gas may be recycled to reactor 1 through line 7. The remaining product gases pass through line 6 and heat exchanger 8 to condensing unit 9. Liquids and gases pass from condensing unit 9 to autoclave 10 through lines 11 and 12, respectively. Water may be added to the autoclave through line 13, and nitric acid produced in the autoclave may be withdrawn through line 14.

Solids may be withdrawn from reactor 1 through line 15 positioned below the interface between the fluidized bed and the gas in the upper portion of the reactor. Countercurrent oxygen purge line 23 is provided in order to purge solids withdrawn through line 15 of entrapped nitrogen gases. A portion of the solids withdrawn through line 15 may be passed through line 16 to fluo-solids regenerator 17 in which the solids are heated by combustion gases entering through line 18.

Solids may be withdrawn from regenerator 17 through line 19 while gaseous material is taken off through line 20. After passing through gas-solids separator 21, the solids may be returned to reactor 1 through line 22.

In the operation of the illustrated embodiment, calcium nitrate is fed into the fluidized bed decomposition zone of reactor 1 maintained at the decomposition temperature of calcium nitrate. A portion of the product gases recycled through line 7 is injected into the reactor at a sufficient spacial velocity to maintain the bed in a fluidized state. The by-product lime removed from the reactor through line 15 is heated in fluo-solids regenerator 17 and is recycled to the reactor through line 22. Sufficient solids are recycled to supply the heat necessary for decomposition under fluid bed conditions. Since the requirement for recycled solids is one of heat transfer rather than of avoiding stickiness, the amount of recycle employed in the present invention can be considerably less than in the prior art techniques referred to above. The temperature to which the recycle solids is raised in regenerator 17 is, of course, a function of the ratio of calcium nitrate feed to recycle solids at which it is desired to operate. Solids can also be recovered from the regenerator effluent and its heat content may be recovered in a conventional manner prior to discharge of the flue gas.

By purging the solids withdrawal stream with oxygen from line 23, any nitrogen values entrapped or otherwise carried over with the solids may be recovered in the form of nitrogen oxides. Thus, the product gas stream leaving reactor 1 will comprise essentially nitrogen oxides, i.e. nitric oxide and nitrogen dioxide, excess oxygen and a small amount of fines, principally calcium oxide. After passage through gas-solids separator 5, and withdrawal of the portion of the product gas employed for fluidization of bed 2, the product gas stream may be passed through heat exchanger 8 and condensing unit 9 in which, under moderate pressure, the stream may be refrigerated so as to remove essentially all of the nitrogen oxides as liquid nitrogen tetroxide. Gaseous oxygen remains in the gas stream. These streams may then be pumped separately through lines 11 and 12 and compressed into an autoclave 10 into which an appropriate amount of water is added through line 13. Nitric acid is produced in autoclave 10 in accordance with known procedures to produce acid having a concentration of 98% or higher. While this autoclave process must be carried out with an excess of oxygen as well known in the art, the autoclave may be operated at considerably reduced pressure in the absence of diluent such as nitrogen. The use of recycled product gas as the fluidizing gas and the inclusion of the recited oxygen purge are highly advantageous features of this embodiment of the present invention.

It will be readily appreciated that the product gases obtained from reactor 1 may be subjected to conventional absorption to produce nitric acid solutions having strengths reaching above the azeotrope of about 68%. In this embodiment, the presence of nitrogen and steam in the product gas stream removed from the reactor is of less significance than in the production of the very high concentration acids as indicated above.

The heat required for decomposition of the calcium nitrate can be furnished by heating the portion of the product gas stream to be recycled to the reactor. However, the low specific heat and specific gravity of the gas would necessitate a relatively high gas recycle to furnish the required amount of heat. In the embodiment illustrated in the drawing, therefore, the heat is supplied by recycling a portion of the lime withdrawn from the reactor. While a fluidized bed regenerator unit 17 was indicated, it is, of course, within the scope of the invention to provide any other convenient means for heating the recycle lime.

It has heretofore been found that, upon decomposition of calcium nitrate, extremely finely divided calcium oxide particles are formed during the evolution of the gaseous products. These fine particles must necessarily be separated from the decomposition gases to be employed for the manufacture of nitric acid. This separation, however, constitutes a difficult operation that adversely affects the overall process of decomposing calcium nitrate for the ultimate recovery of the nitrogen values as nitric acid.

In the fluidized bed process of the present invention, on the other hand, the particles of lime tend to grow during the calcium nitrate decomposition due to agglomeration and deposition of new lime on the surface of the existing particles. For example, calcium nitrate samples were decomposed in a fluid bed reactor maintained at decomposition temperature in accordance with the present invention. The particle size distribution of the lime during the runs is set forth in Table I as follows:

TABLE I

| Time (min.) | Particle size distribution, mesh | | | | | Gas velocity (ft./sec.) |
|---|---|---|---|---|---|---|
| | +20, percent | +40, percent | +60, percent | +80, percent | −80, percent | |
| 0 | 0 | 0 | 50 | 100 | | |
| 11.1 | 0.9 | 1.7 | 56.8 | 100 | | 1.76 |
| 17.0 | 4.5 | 12.1 | 71.2 | 100 | | 1.76 |
| 28.4 | 23.5 | 40.9 | 87.1 | 100 | | 3.17 |
| 0 | 5 | 32.5 | 67.5 | 95.0 | 5.0 | |
| 5 | 12.6 | 52.8 | 86.6 | 99.2 | 0.8 | 1.76 |
| 10 | 15.6 | 63.8 | 91.5 | 99.3 | 0.7 | 1.76 |
| 15 | 18.7 | 72.0 | 95.3 | 100.0 | 0.0 | 2.64 |
| 20 | 19.2 | 73.4 | 97.2 | 100.0 | 0.0 | 2.64 |

As demonstrated by the results shown in Table I, a definite tendency for growth of the lime particles in the fluidized bed occurs during calcium nitrate decomposition. This growth and the resultant withdrawal of coarser particles from the decomposition zone tends to minimize the carry-over of fines into the product gas stream. This feature of the present invention is of great significance in view of the difficulty with which such fines are removed from the product gas stream.

As indicated above, one embodiment of the present invention calls for the heating of a portion of the lime withdrawn from the decomposition zone followed by recycling to the bed in the reactor. If the recycled lime were to continue to grow in particle size, the particles would eventually become too large for satisfactory fluidization. When the particles of lime are reheated, however, it has been found that a breakdown in particle size occurs. As a result, the reheated lime has a particle size more appropriate for fluidization than the coarser particles as withdrawn from the decomposition zone. The disintegration of calcium oxide particles on heating is shown in Table II, which indicates the effect of heating on the particle size distribution of the calcium oxide.

TABLE II

| Temperature (° F.): | Size distribution, mesh | | | | |
|---|---|---|---|---|---|
| | +20, percent | +40, percent | +60, percent | +80, percent | −80, percent |
| 25 | 0.0 | 50.0 | 100.0 | | |
| 1,290 | 0.0 | 38.3 | 56.7 | 95.8 | 4.2 |

It can readily be seen from the results shown in Table II that heating causes a breakdown in particle size of the lime particles so that a finer particle size distribution is obtained. While fines may thus be produced in the regenerating unit, the production of fines at this point is of less consequence than the production of fines in the reactor. The flue gas from the regenerating unit, together with very fine material contained therein, will ordinarily be discarded after heat recovery. In order to avoid air pollution, the gas may be passed through a water scrubber. The use of such a scrubber cannot be tolerated, however, with respect to the product gas stream from which very highly concentrated nitric acid is to be produced.

In the decomposition of particular samples of calcium nitrate under static conditions, the bulk density of the lime produced was about 30 pounds per cubic foot. Lime produced in the fluidized bed decomposition of such calcium nitrate, however, had a density of about 68 to 70 pounds per cubic foot. The density distribution of calcium oxide from the decomposition of calcium nitrate in accordance with the present invention was as set forth in Table III below.

TABLE III

Bulk density of calcium oxide

| Particle size range (mesh): | Bulk density, lbs./ft.³ |
|---|---|
| +20 | 68.0 |
| −20 +40 | 74.2 |
| −40 +60 | 77.8 |
| −60 +80 | 62.5 |
| −80 | 51.8 |

While the degree of agglomeration and particle growth will depend upon such factors as initial particle size distribution and the particular decomposition temperature, the results in Table III further demonstrate that a larger, more stable product is obtained in the fluidized bed decomposition process of the present invention. The increase in bulk density for particles of relatively finer particle size is indicative of the agglomeration and formation of higher and larger particles that serves to minimize the production and carry-over of fines in the product gas stream as discussed above. In the regeneration zone, on the other hand, the lime tends to disintegrate under heating. While the degree of disintegration will depend upon such factors as the initial particle size distribution and the desired reheat temperature, the bulk density of the recycled lime, following heating in the regeneration zone, is commonly on the order of about 50 to 55 pounds per cubic foot.

The nitrogen oxide-containing atmosphere employed herein can, of course, be obtained in any convenient manner. Ammonia gas may be burned, for example, to form nitrogen oxides, e.g. nitric oxide and nitrogen dioxide, from which the water of reaction may be condensed and trapped away in a conventional manner. The nitrogen oxides may thereafter be injected into the decomposition zone so as to establish the nitric oxide-containing atmosphere therein.

While the present invention has been described herein with respect to nitrogen oxide-containing atmospheres in which the quantity of inerts and water has been minimized, it is also within the scope of the invention to employ a nitrogen oxide-containing atmosphere in which the quantity of inerts and water is not minimized. For example, ammonia gas may be mixed with air, e.g. 11 percent $NH_3$, passed through a fine wire gauze of activated platinum raised to glowing heat, and combined to form nitric oxide, i.e. (NO), and water. At least a portion of the nitric oxide will convert to nitrogen dioxide. The mixed nitrogen oxides, together with the water of reaction, may be injected into the decomposition zone to provide a nitrogen oxide-containing atmosphere during decomposition of calcium nitrate.

As indicated above, the calcium nitrate may be fed to the decomposition zone as an anhydrous crystalline salt, as a melt of the anhydrous salt, or as a highly concentrated aqueous solution of the salt in those instances in which it is desired to maintain the ratio of water to nitrogen oxides as low as possible. In addition to the fluidized bed decomposition zone described above, various other techniques may be employed for contacting the calcium nitrate and the nitrogen oxide-containing atmosphere during decomposition. Thus, a rotary kiln containing a bed of residual lime may be employed. The bed may be maintained by recycling by-product lime formed during the thermal decomposition of the calcium nitrate. Any other conventional type contacting chamber in which the calcium nitrate may be exposed to decomposition temperature in the presence of a nitrogen oxide-containing atmosphere may be employed in the practice of the present invention. In one embodiment, a nitrogen oxide-containing gas may be fed countercurrently to the calcium nitrate feed so as to assure the thorough contacting of the calcium nitrate with the gas, which may be heated to supply all or a portion of the heat necessary for decomposition. It is also within the scope of the present invention to include carbon dioxide in the nitrogen oxide-containing atmosphere. Since the carbon dioxide tends to react with the by-product lime in an exothermic reaction, the heat requirements for the calcium nitrate decomposition are thus reduced. While the amount of carbon dioxide is not critical, the nitrogen oxide-containing atmosphere may conveniently contain 20% or more by weight $CO_2$, although lesser quantities may also be employed.

In another embodiment of the present invention, the calcium nitrate may be injected into the decomposition zone in the form of a mist or spray of atomized droplets. Complete external melting of the calcium nitrate solids, or any hydrates thereof, can be accomplished continuously with any of the standard, commercially available melting furnaces commonly employed for similar purposes. Gas or oil fired units and electric units are commercially available. Injecting the calcium nitrate melt into the decomposition zone can be accomplished in a variety of ways. The melt can, for example, be put under pressure and passed through a venturi ejector in which it is mixed with the heat-carrying nitrogen oxide-containing atmosphere so as to form a mist that is injected into the decomposition zone. Likewise, hot nitrogen oxide-containing gas may be compressed and passed through the nozzle of a venturi type ejector so as to pull the melt from the melting unit by the vacuum induced in the suction end of the venturi, thus mixing the nitrogen oxide-containing gas and the calcium nitrate melt to produce a spray mist that is injected into the decomposition zone. In another embodiment, the melt can be injected directly as atomized droplets into the decomposition zone in which it is mixed with the hot, nitrogen oxide-containing atmosphere to affect decomposition.

In FIG. 2, calcium nitrate solids are decomposed so as to form nitrogen oxides that can be converted to nitric acid. The calcium nitrate solids being decomposed may be those formed in the nitric acid acidulation of phosphate rock to form wet process phosphoric acid. This acidulation step and the subsequent conventional separation of calcium nitrate from the reaction mixture is not shown in the drawing. The separated calcium nitrate solids are fed to screw conveyor 101 that transports them to the melting section of an electric melter 102 having a separate melting section 102a and holding section 102b. Exhaust fan 103 is provided to remove any vapors formed during the melting from melting section 102a. Pressure exerted by means of compressed air line 104 forces the calcium nitrate melt from holding section 102b to a standard disk atomizer 105 positioned at the upper end of decomposition chamber 106.

A hot nitrogen oxide-containing gas obtained, for example, by the burning of ammonia is introduced into the lower portion of decomposition chamber 106 by means of conduit 107. Countercurrent flow of the calcium nitrate melt and the nitrogen oxide-containing gas is thereby achieved in decomposition chamber 106. A portion of the by-product lime collects in the bottom of decomposition chamber 106 and is discharged through air lock valve 108 onto screw conveyor 109, which removes it to storage and ultimate use as a by-product of the acidulation process. The remainder of the lime formed in decomposition chamber 106 is removed as fines in the nitrogen oxide gas stream passing out of decomposition chamber 106 through conduit 110. This product gas stream passes through dust collector 111 in which the fines are removed therefrom and collected. The lime thus removed from the product gas stream is passed through air lock valve 112 onto screw conveyor 113 that discharges the collected lime for storage with the lime recovered from the bottom of decomposition chamber 106.

After leaving dust collector cyclone 111, in which a large portion of the fines are removed therefrom, the product nitrogen gas stream may be passed through conventional electrosatic Cottrell precipitators or a conventional bag house, not shown, for removal of additional fines that may still be present in the gas stream. The gases are then passed to a conventional nitric acid manufacturing unit, not shown, in which the nitrogen oxides are absorbed in water to form nitric acid. The nitric acid thus formed may thereafter be recycled to the original nitric acid acidulation operation in order to produce additional quantities of wet process phosphoric acid and by-product calcium nitrate that may be in accordance with the novel decomposition process of the present invention.

By means of the present invention, essentially all of the nitrogen values contained in the calcium undergoing decomposition may be recovered and converted into nitric acid. Thus, the present invention provides a highly desirable overall process for producing phosphatic fertilizers and wet process phosphoric acid by the nitric acid acidulation of phosphate rock. In view of the well known and critical need in the industry for alternatives to the ever increasing need for sulfur, the present invention is of the greatest importance to producers of wet process phosphoric acid, phosphatic feritilizers and related agricultural and other products.

While the present invention has been described herein with reference to particular embodiments thereof, it will be readily appreciated by those skilled in the art that various changes and modifications can be made therein without departing from the scope of the present invention as hereinafter set forth in the appended claims.

Therefore, I claim:

1. A process for the recovery of nitric acid from calcium nitrate formed by the action of nitric acid on mineral phosphate which comprises contacting said calcium nitrate with hot nitrogen oxide gases generated by the oxidation of ammonia, recovering calcium oxide as a solid product, withdrawing nitrogen oxides formed by the decomposition of said calcium nitrate as a gaseous product and converting said gaseous product to nitric acid.

2. An improved process for the decomposition of calcium nitrate and utilization of decomposition products therefrom which comprises:
   (a) decomposing calcium nitrate in a fluidized bed decomposition zone, said bed comprising lime particles, to form nitrogen oxide gases and lime as decomposition products,
   (b) removing said nitrogen oxide gases from above the bed and recycling at least part of said gases substantially as the sole fluidizing medium,
   (c) withdrawing by-product lime from said bed separately from said product gases and purging said lime with oxygen to recover nitrogen values therefrom, and
   (d) combining the purge stream of step (c) and a portion of the nitrogen oxide gases of step (b) with water to form nitric acid.

3. A process according to claim 2 in which the decomposition temperature is in the range of from about 650° C. to about 675° C.

4. A process according to claim 2 in which the calcium nitrate is in a substantially anhydrous form to minimize the formation of nitric acid.

5. A process according to claim 2 in which the recycled gases of step (b) are heated to about about 650° C. prior to passage through the fluidized bed decomposition zone.

6. A process according to claim 2 in which the lime of step (c) is heated to substantially reduce the size of the particles and the hot, particulate lime is recycled to the fluidized bed.

7. A process according to claim 6 in which the bulk density of the lime recycled to the fluidized bed is from about 50 to about 55 pounds per cubic foot.

References Cited

UNITED STATES PATENTS

| | | | |
|---|---|---|---|
| 2,714,550 | 8/1955 | Miller | 23—158X |
| 2,757,072 | 7/1956 | Kapp et al. | 23—158 |
| 2,985,527 | 5/1961 | Nossen | 71—39 |

FOREIGN PATENTS

| | | | |
|---|---|---|---|
| 22,018 | 1891 | Great Britain | 23—158 |

OSCAR R. VERTIZ, Primary Examiner

G. O. PETERS, Assistant Examiner

U.S. Cl. X.R.

23—186